(12) United States Patent
Aharonson et al.

(10) Patent No.: US 6,731,803 B1
(45) Date of Patent: May 4, 2004

(54) POINTS BASED HANDWRITING RECOGNITION SYSTEM

(75) Inventors: Eran Aharonson, Ramat HaSharon (IL); Boaz Aviad, Tel Aviv (IL)

(73) Assignee: Advanced Recognition Technologies, LTD, Tel Aviv (IL)

( * ) Notice: Subject to any disclaimer, the term of this patent is extended or adjusted under 35 U.S.C. 154(b) by 549 days.

(21) Appl. No.: 09/614,860

(22) Filed: Jul. 12, 2000

Related U.S. Application Data

(60) Provisional application No. 60/142,969, filed on Jul. 12, 1999.

(51) Int. Cl.$^7$ ................................................ G06K 9/00
(52) U.S. Cl. ...................... 382/187; 382/209; 382/186; 382/202
(58) Field of Search ..................... 382/119–123, 173, 382/181, 184–190, 201, 202, 205, 209, 217, 218, 229, 305, 313–315; 178/18.01, 18.03, 19.01, 19.04; 345/169, 173, 179, 189

(56) References Cited

U.S. PATENT DOCUMENTS

| | | | |
|---|---|---|---|
| 3,127,588 A | 3/1964 | Harmon | 382/186 |
| 3,996,557 A | 12/1976 | Donahey | 382/186 |
| 4,005,400 A | 1/1977 | Engdahl | 341/5 |
| 4,066,998 A | 1/1978 | Lidkea | 382/186 |
| 4,495,646 A * | 1/1985 | Gharachorloo | 382/188 |
| 4,638,118 A * | 1/1987 | Wang et al. | 178/18.01 |
| 4,703,511 A * | 10/1987 | Conoval | 382/182 |
| 4,727,357 A | 2/1988 | Curtin et al. | 341/22 |
| 5,038,382 A * | 8/1991 | Lipscomb | 382/189 |
| 5,105,470 A | 4/1992 | Will | 382/486 |
| 5,303,312 A * | 4/1994 | Comerford et al. | 382/189 |
| 5,521,986 A | 5/1996 | Curtin, II et al. | 382/187 |
| 5,596,656 A | 1/1997 | Goldberg | 382/186 |
| 5,615,283 A | 3/1997 | Donchin | 382/187 |
| 5,659,633 A | 8/1997 | Ilan et al. | 382/106 |
| 5,764,794 A | 6/1998 | Perlin | 382/186 |
| 5,774,582 A | 6/1998 | Gat et al. | 382/186 |
| 5,809,465 A | 9/1998 | Ilan et al. | 704/241 |
| 5,812,698 A | 9/1998 | Platt et al. | 382/186 |
| 5,850,477 A * | 12/1998 | Takada | 382/186 |
| 5,889,889 A | 3/1999 | Sinden | 382/187 |
| 6,041,137 A * | 3/2000 | Van Kleeck | 382/185 |
| 6,094,506 A * | 7/2000 | Hullender | 382/186 |
| 6,229,529 B1 * | 5/2001 | Yano et al. | 345/175 |
| 6,307,955 B1 * | 10/2001 | Zank et al. | 382/121 |

OTHER PUBLICATIONS

Yamasaki, et al. "A new data tablet system for handwriting characters and drawing based on the image processing", IEEE, pp. 428–431, 1996.*

Chang, et al. "Analysis of stroke structures of handwritten Chinese characters", IEEE, pp. 47–61, Feb. 1999.*

\* cited by examiner

*Primary Examiner*—Daniel Mariam
(74) *Attorney, Agent, or Firm*—Seth Natter; Natter & Natter

(57) ABSTRACT

A points based handwriting recognition system is suitable for hand held processor implemented devices with small touch pad writing surfaces. The writing surface is divided into a grid by a number of spaced discrete points. The user is instructed to write, as by a stylus, characters such as letters, numbers or symbols with the writing path extending through a predetermined sequence of the points which define the grid. The stylus must pass sequentially within a specified distance of mandatory points for processor recognition of each written character and may additionally pass within a predetermined distance of optional points.

15 Claims, 8 Drawing Sheets

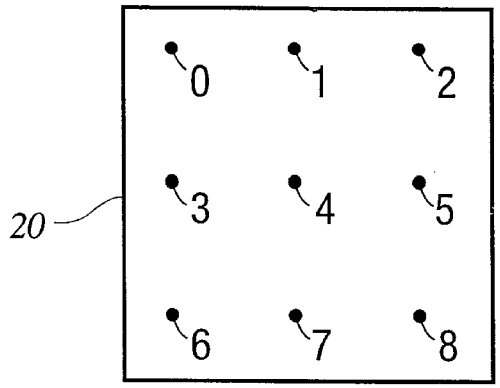

POINTS BASED HANDWRITING RECOGNITION SYSTEM

RELATED APPLICATIONS

This application claims the benefit of U.S. Provisional Application No. 60/142,969 filed Jul. 12, 1999.

BACKGROUND OF THE INVENTION

1. Field of the Invention

This invention relates generally to data input devices and more particularly to a handwriting recognition system.

2. Antecedents of the Invention

The traditional data input device for processor implemented systems such as personal computers comprised a keyboard. Keyboards were accurate, reliable and cost effective.

Requirements for data input systems expanded beyond computers, however, to processor implemented devices such as hand held devices, e.g. organizers, cellular telephones and pagers. Due to the small size of these devices, keyboard based data input was impractical. These devices were designed to be hand held and carried on one's belt or in a pocket. Further, these devices were configured for data input while the user was in transit, while standing, walking, etc., without space to rest a keyboard for data input.

In some systems, a key pad was employed for data input with the input data being selected by the number of times a specific key was pressed. For example, the number 5 key corresponded to the letters J, K and L. Successive depressions of the number 5 key resulted in display of the letters J, K and L successively.

A further approach utilizing the key pad was to scroll through the letters J, K and L when the number 5 key was depressed. Another key pad based data input system was premised upon statistical linguistics which selected the most common word after only a few initial letters were keyed.

Further data input systems were premised upon recognition of handwritten symbols having separated shapes. The symbols were configured for ease in the recognition process, such as unistroke symbols described in U.S. Pat. No. 5,596,656 issued to GOLDBERG. Users, however, had a tendency to write in the natural manner rather than in artificial unistrokes and as a result, recognition levels suffered. Other handwriting recognition systems placed constraints upon natural writing and thus did not achieve high recognition levels.

BRIEF SUMMARY OF THE INVENTION

A handwriting recognition system suitable for data input in hand held processor implemented devices includes a writing surface, e.g. a touch pad, having a finite number of discrete points at predetermined spaced locations. A user inputs data by writing on the touch pad, as by a stylus, characters such as letters, symbols and numbers following a predetermined sequence of points.

Alphabet letters, numbers and punctuation symbols can be recognized utilizing a writing surface with a grid having as little as nine points. When a grid having twelve points is utilized, a reference base line is obtained to simplify writing and recognition of letter characters having depending portions.

For each letter, number or symbol, there is a specified sequence of mandatory "anchor" points through which the stylus must sequentially pass within a predetermined minimum distance and a specified number of "optional" points which the stylus may, but is not required to pass through.

The user enters data in substantially a natural handwriting format with characters being written to conform with the sequential points path requirements of the recognition system.

From the foregoing compendium, it will be appreciated that it is a consideration of the present invention to provide a handwriting recognition system of the general character described which is easy to learn and to use.

An aspect of the present invention is to provide a handwriting recognition system of the general character described which achieves a high recognition rate.

It is a feature of the present invention to provide a handwriting recognition system of the general character described which is relatively low in cost.

Another consideration of the present invention is to provide a handwriting recognition system of the general character described which achieves a high rate of throughput.

A further aspect of the present invention is to provide a handwriting recognition system of the general character described which utilizes but a minimal amount of processing power.

To provide a handwriting recognition system of the general character described with minimal memory requirements is another feature of the present invention.

Yet another consideration of the present invention is to provide a handwriting recognition system of the general character described which is well adapted for employment with writing surfaces of limited size.

Another aspect of the present invention is to provide a handwriting recognition system of the general character described which is capable of being integrated inside the controller of a touch pad.

Yet a further feature of the present invention is to provide a handwriting recognition system of the general character described adapted for implementation with a touch enabled screen of a cellular telephone.

A further aspect of the present invention is to provide a handwriting recognition system of the general character described which employs a natural handwriting format.

Other considerations, features and aspects in part would be obvious and in part would be pointed out hereinafter.

With these ends in view, the invention finds embodiment in certain combinations of elements, arrangements of parts and series of steps by which the aforesaid considerations, aspects and features and certain other considerations, aspects and features are attained, all with reference to the accompanying drawings and the scope of which will be more particularly pointed out and indicated in the appended claims.

BRIEF DESCRIPTION OF THE DRAWINGS

In the accompanying drawings in which is shown some of the various exemplary embodiments of the invention:

FIG. 1 is an enlarged scale plan view of a typical writing surface such as a touch pad, electromagnetic pad, touch enabled screen, etc. and showing a grid defined by nine equidistantly spaced points;

FIG. 2 comprises a chart of typical lowercase alphabet letters, the sequential point identification corresponding to each letter and a depiction of each letter as handwritten on a grid comprising points in accordance with the present invention;

DESCRIPTION OF THE PREFERRED EMBODIMENTS

Figure 3:
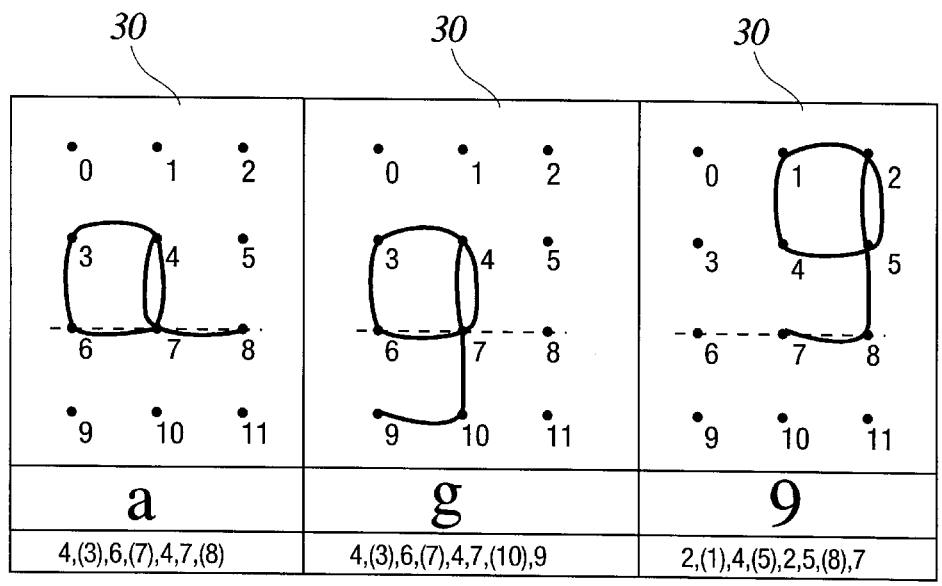
FIG. 3 comprises a chart of two lowercase letters and the numeral 9, the corresponding sequential point description of such characters on a twelve point grid and a depiction of the handwritten characters on a twelve point grid, illustrating an imaginary horizontal base line.

In accordance with the present invention, a handwriting recognition system suitable for inputting data on a writing surface of a wide variety of processor implemented portable devices such as organizers, cellular phones, smart pagers and the like is provided. Typical applications of data input might entail writing while standing or walking, with the paramount objective of achieving a high recognition rate.

The writing surface includes a grid pattern defined by a predetermined minimal number of points, e.g. as little as nine points. By utilizing a twelve point grid, an alphabet letter reference base line is obtained for ease in writing and recognizing letter characters with depending portions.

With the grid supplying visual guidance on how and where to write, user learning is simplified. Users will readily adapt to write recognizable characters in accordance with the recognition system pursuant to the invention in a manner analogous to that of a young child learning penmanship in school utilizing the aides of paper marked with a connect-the-dots format to assist in positioning and shaping letter characters.

Referring now in detail to the drawings, the reference numeral denotes generally a typical writing surface such as a touch pad, electromagnetic pad, etc. constructed in accordance with the invention. The writing surface 20 includes a grid defined by a plurality of nine spaced points, bearing the numeral designations 0 through 8.

In accordance with the invention, a user enters data by writing on the writing surface 20, the desired letter character, with a stylus, a finger, or other implement utilizing the grid as a guide following a predefined sequence of points, each of which is separated from one another by a discernable distance, as illustrated in the drawing figures. The user can thus easily learn how to write letter characters, numbers and symbols in accordance with the invention and the system will attain a high recognition rate utilizing a relatively small number of points, while the user employs a natural handwriting style. Further, the points may be modified in position, for example, being sloped along a vertical axis to enable slanted handwriting or the density or positions of the points can be modified according to usage.

It should also be appreciated that this invention can also encompass, in lieu of handwriting, entering handwriting symbols through a mouse.

In FIG. 2 there is shown a table 22 of lowercase letter characters, corresponding point descriptions and corresponding traces of the handwritten data entry on a writing surface.

Pursuant to the invention, for each letter, numeral or symbol, there are specified mandatory "anchor" points which the stylus must sequentially pass through or within a specified minimum distance of and specified "optional" points which the stylus may, but is not required to pass through or within a minimum distance of.

The discernable distance between points is such that, for example, the height of each handwritten letter illustrated in table 22 is twice the distance between adjacent points. The distance between points would remain discernable as long as the stylus moves across an area of the writing surface which does not include any points.

The term "stylus" as employed hereinafter should be understood to encompass any writing device including one's finger or a mouse and "pass through" should be interpreted to include passing within a specified minimum distance of the respective point.

With reference now to a top row of the table 22, the lowercase letter "a" for example, will be recognized if the processor ascertains that the stylus sequentially passes through the points 1, 3, 6, 4 and 7, comprising the mandatory anchor points.

The processor will also recognize the same lowercase letter "a" if the stylus sequentially passes through the points 1, (0), 3, 6, (7), 4, (1), (4), 7 and (8). The points designated in parenthesis are optional points and the stylus need not pass through any of the optional points for the processor to recognize the lowercase letter "a".

With reference now to the letter "m" as appearing in the table 22, it should be noted that such letter will be recognized if the stylus sequentially passes through the points 0, 3, 6, (3), 1, 4, 7, (4), 2, 5 and 8.

Point identification sequences for the entire English alphabet in lowercase and uppercase letters as well as numerals are available utilizing the nine point grid of the writing surface 20 and the tabulation of lowercase letters in FIG. 2 is merely exemplary.

Turning now to FIG. 3, there is depicted a table of typical lowercase letters "a", "g" and a number nine, and the corresponding sequential point description of such characters as well as the handwritten appearance of such characters on a writing surface 30 which includes a twelve point grid with the points bearing the numeral designations 1 through 11. Utilization of the twelve point grid on the writing surface 30 provides for an imaginary base line through points 6, 7 and 8 as depicted by the dashed lines in FIG. 3. Thus, a baseline is provided for depending portions of the lowercase letters "f", "j", "p", "q" and "y".

From an examination of FIG. 3, it should be noted that the lowercase letter "g" and the numeral 9 are distinguished and recognized by the system due to the different sequential points descriptions arising out of the starting point of each respective character on the twelve point grid.

Figure 4:
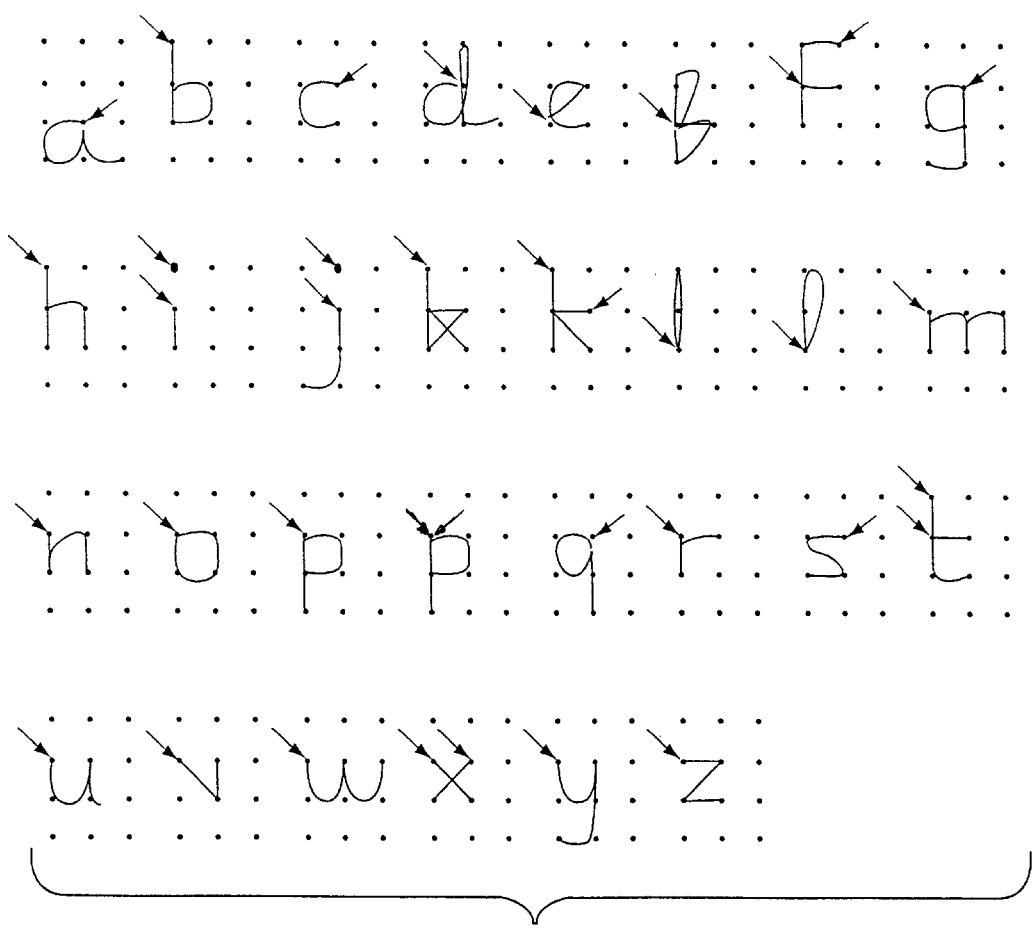
FIG. 4 comprises a depiction of handwritten lowercase letters of an entire alphabet on a twelve point grid.
Figure 5:
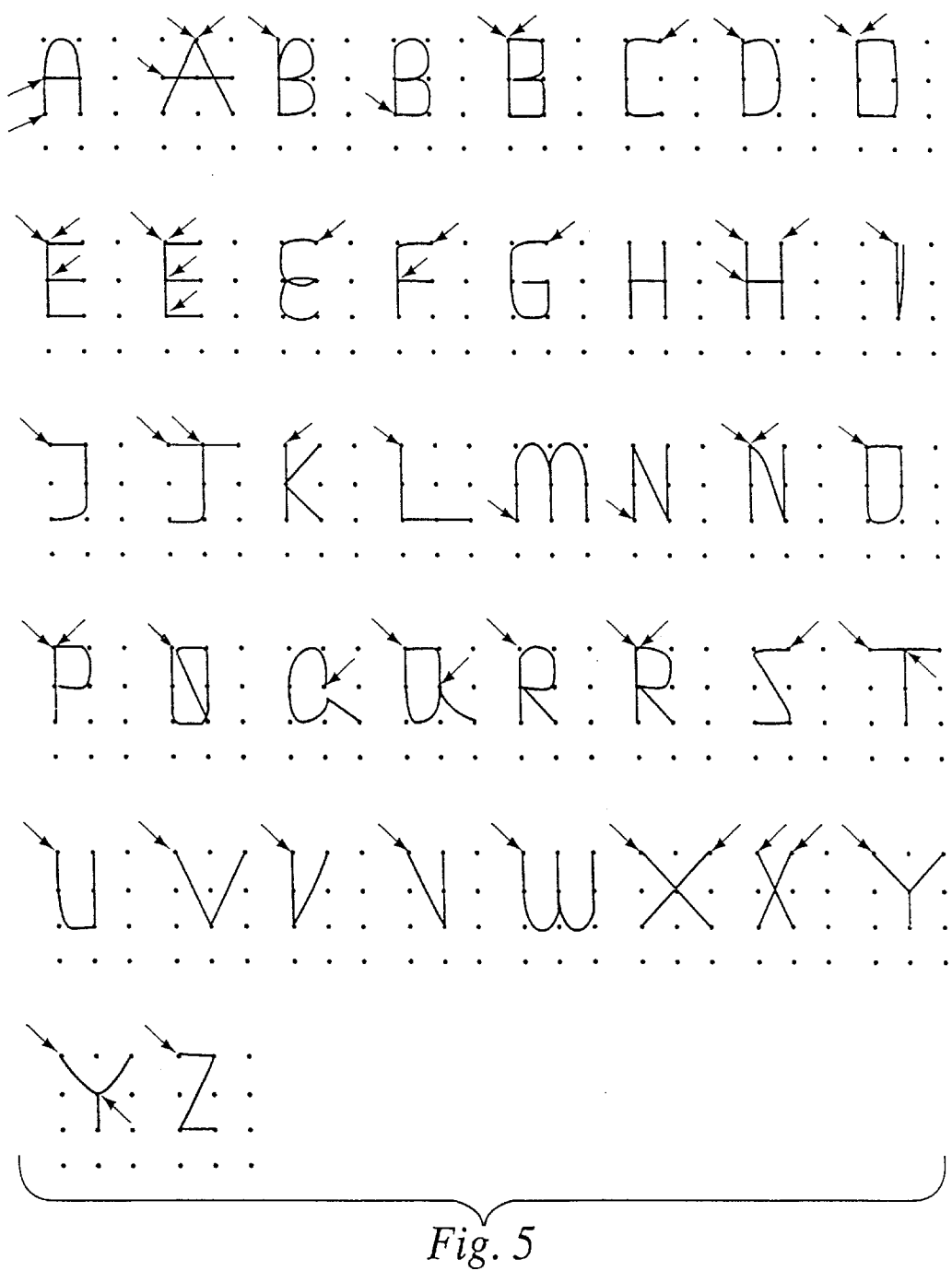
FIG. 5 comprises a depiction of handwritten uppercase letters of an entire alphabet on a twelve point grid.

FIG. 4, depicts an entire lowercase alphabet on a twelve point grid. The starting points of each handwritten letter are identified by an arrow in FIG. 4. FIG. 5 depicts an entire uppercase alphabet on a twelve point grid with starting points indicated by an arrow.

Figure 6:
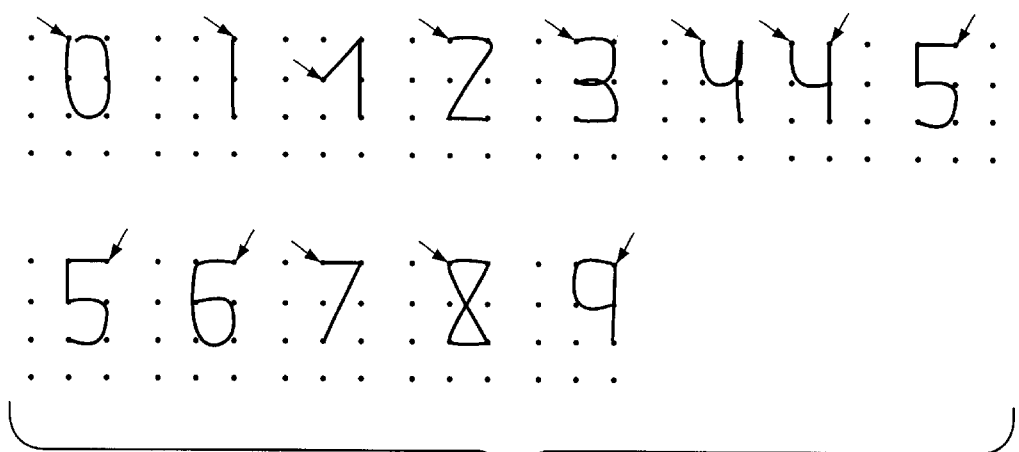
FIG. 6 comprises a depiction of handwritten numeral designations on a twelve point grid.
Figure 7:
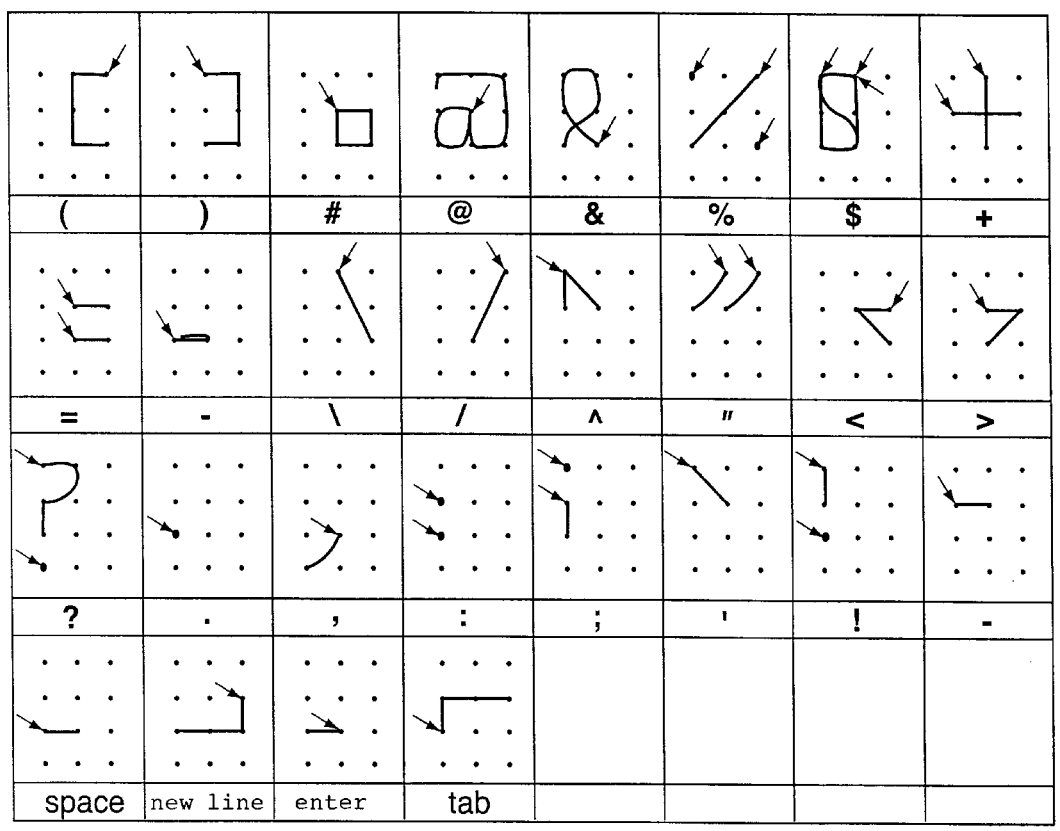
FIG. 7 comprises handwritten punctuation symbols on a twelve point grid.

Depicted on a twelve point grid in FIG. 6 are the numbers zero through nine while FIG. 7 depicts punctuation and other symbols on a twelve point grid. Starting points are indicated by arrows.

As previously mentioned with respect to the lowercase letter "g", and the numeral "9" illustrated in FIG. 3, although the stroke patterns of the characters are identical, the starting points differ as do the sequential order of points. The handwriting system is thus able to recognize the correct character.

The handwriting characters may be formed of multiple strokes with the system making a determination when one character ends and the next character begins by any of several known procedures, e.g.:

1) Time out—After ending each character, the user pauses for a time-out period;
2) Prefix coding—The characters are coded in a way that no character is a prefix of another character. That means that once a stroke is recognized, the system knows if it is part of a character and waits for the rest of the strokes of that character. Using prefix coding, an sequence of strokes has only one way to transfer into character sequences and it is impossible that one symbol is a prefix of another symbol; and
3) Dynamic segmentation—Computing from the series of strokes, the most probable character sequence. This can be done in what is referred as the "run-on" method including applying statistical methods, linguistics tools, a dictionary, etc.

Figure 8:
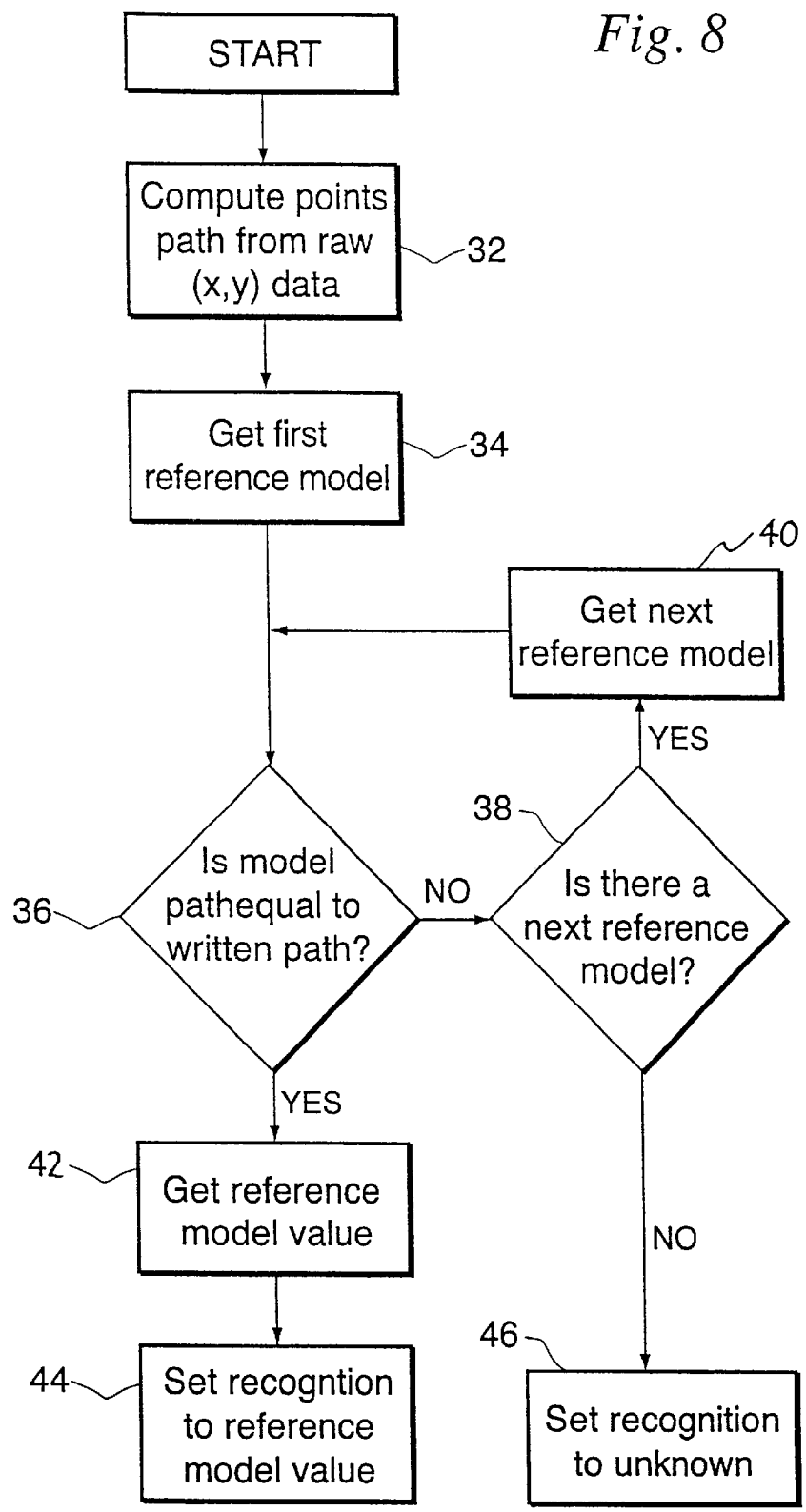
FIG. 8 comprises a block diagram showing an overview of various steps for handwriting recognition under the invention.

FIG. 8 comprises a block diagram which provides an overview of the various steps in the handwriting recognition system of the present invention. Initially the processor determines the sequential order of points through which the stylus has passed from the raw (x,y) coordinates of the stylus as it traverses the writing surface, as indicated in a block 32.

Thereafter, the processor accesses a first reference model, e.g. letter character, from a library as indicated in a block 34. Subsequently, the processor compares the sequential order or stylus points ascertained in the block 32 with the first reference model obtained in the block 34 as indicated in a block 36. An inquiry is made whether there is a match, if not, an inquiry is made as to whether or not there are any further reference models, as indicated in a block 38. If there are further reference models, the next reference model is obtained as indicated in a block 40 and the comparison of the sequential order of points is made with the next reference model.

If a determination is made that the sequential order of stylus points matches the reference model by including all mandatory anchor points in proper sequential order and any of the optional points in sequential order, the value of the reference model is ascertained as indicated in a block 42 and the recognition is set to the reference model value, as indicated in a block 44.

If no further reference models were found as a result of the inquiry in the block 40, the recognition is set to "unknown" as indicated in a block 46.

Figure 9:
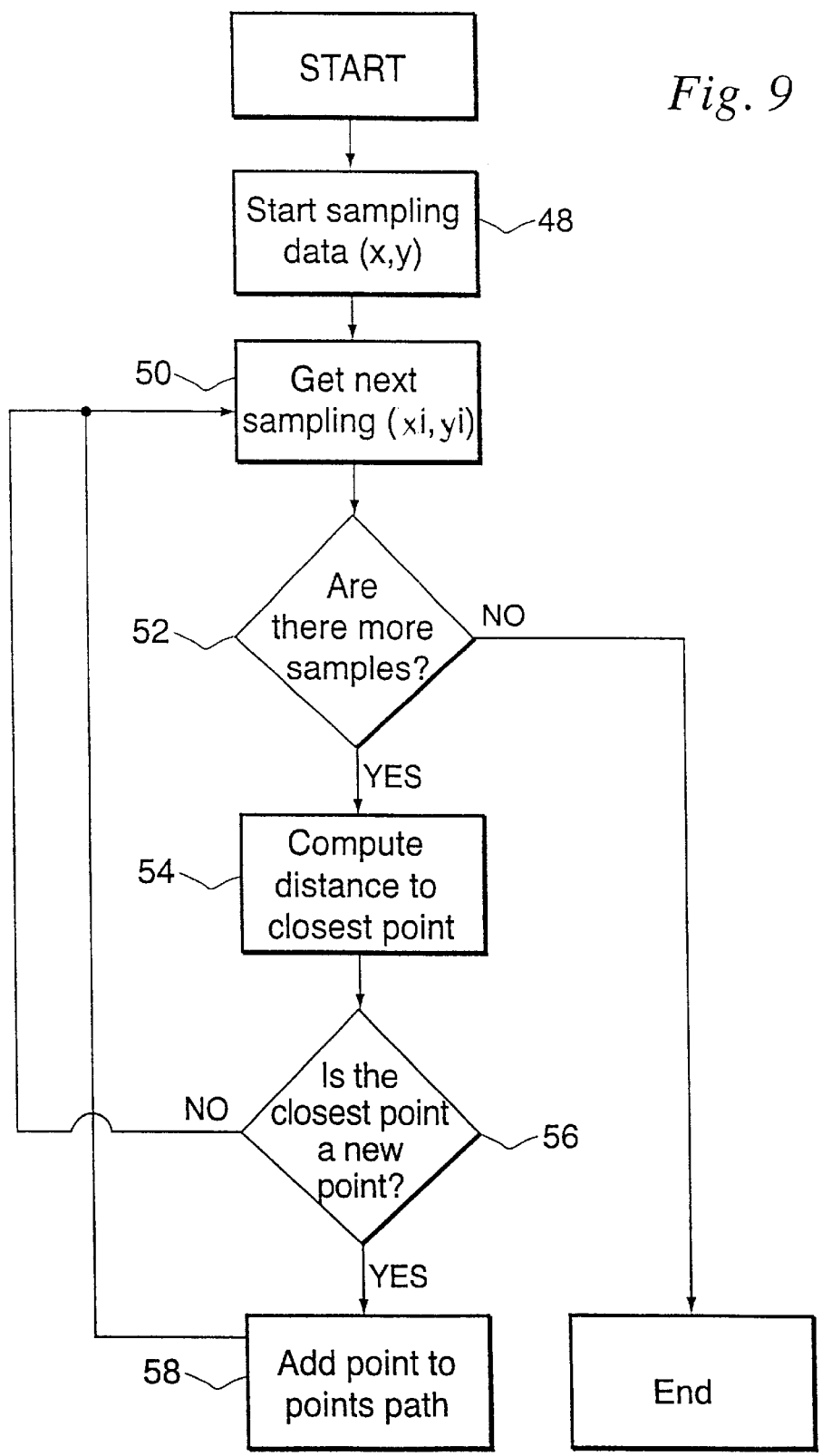
FIG. 9 illustrates a routine for ascertaining the sequential order of points of a handwritten character.

Turning now to FIG. 9, wherein a routine for computing the sequential order of points from the instantaneous x, y coordinates of the stylus is shown as depicted in the block 32 of FIG. 8, it will be seen that upon the processor entering the routine, x, y coordinate stylus data is sampled as indicated in a block 48, followed by a further sampling of x, y coordinate stylus data as indicated in a block 50. Thereafter, an inquiry is made if any further samples are present as indicated in an inquiry block 52. If no further samples are present, the routine ends, however, if further samples are present, a computation is made as to the distance to the closest point on the writing surface grid, as indicated in a block 54.

An inquiry is then made, as indicated in a block 56, as to whether or not the closest grid point to the stylus is a new point as indicated in the block 56 and if so, the new point is added as the last sequential point, as indicated in the block 58 and the routine returns to the block 50. If the closest point to the stylus is not a new point, the processor returns to obtain the next x, y coordinate sample of the stylus path, returning to the block 50.

Figure 10:
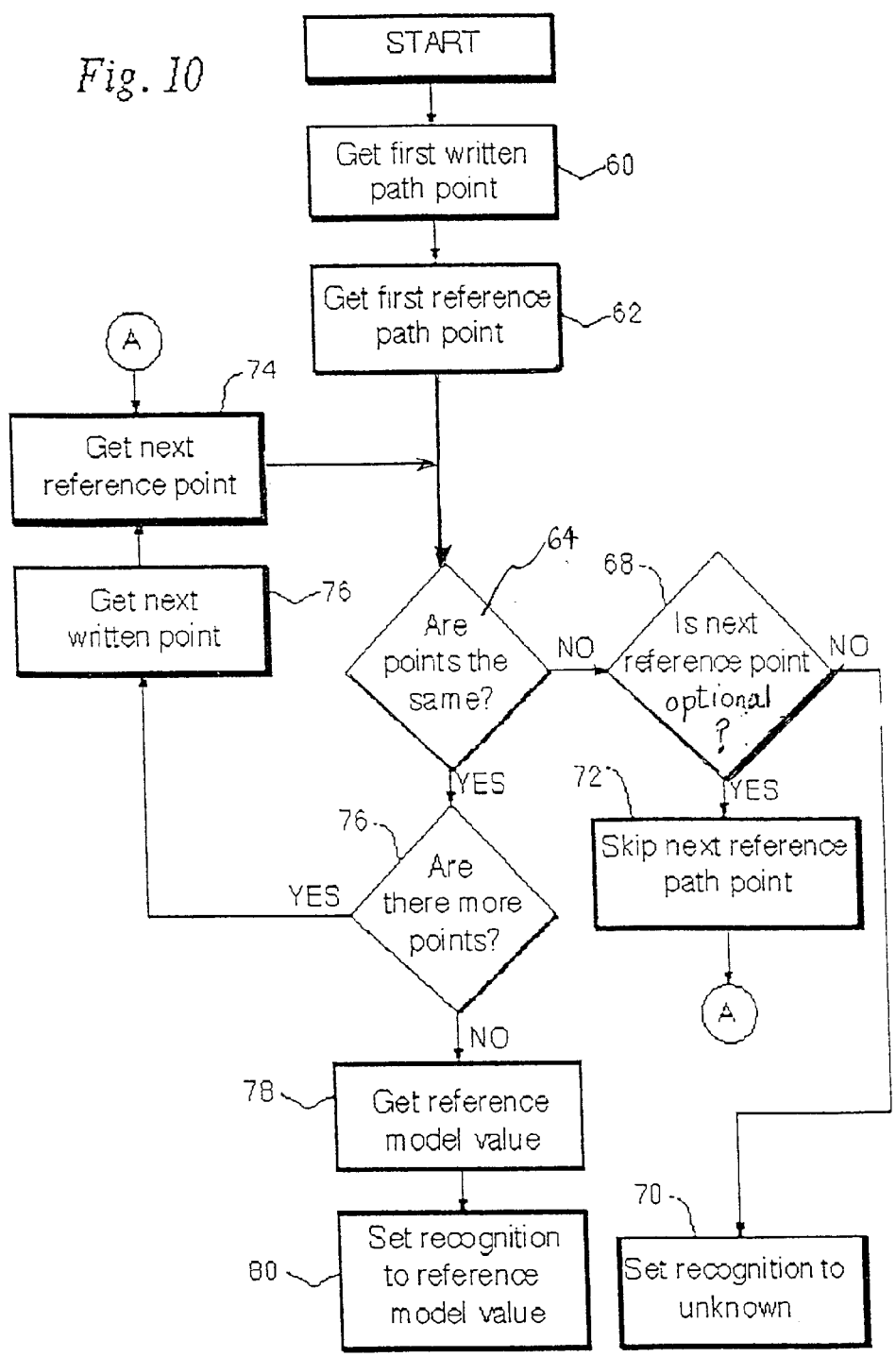
FIG. 10 comprises a flow chart of a subroutine for comparison of an ascertained order of points with reference models.

In FIG. 10, there is illustrated a flow chart for the procedure depicted in blocks 36 and 38 of FIG. 8, that is, the comparison of the sequential order of stylus points with a reference model.

Upon entering the routine, the processor accesses the first written path point as indicated in a block 60 and then accesses the first reference path point as indicated in a block 62. A comparison is then made as indicated in an inquiry block 64. If the compared points are the same, an inquiry is made as to whether or not there are any more points in the stylus path as indicated in a block 66.

If the points are not the same, an inquiry is made as to whether or not the reference point is an optional point as indicated in a block 68 and if not, the recognition is set to "unknown" as indicated in the block 70. If, on the other hand, the reference point is an optional point, the reference path point is skipped as indicated in a block 72 and the processor accesses the next reference point as indicated in a block 74 and commences the comparison in the block 64.

If, upon entering the inquiry block 66, it is determined that there are more points in the sequential order of stylus points, the next stylus point is accessed as indicated in a block 76 and the next reference point is accessed as indicated in the block 74 and the comparison is made as indicated in the block 64.

If, upon entering the inquiry block 66 it is determined that there are no further points, a match has been made and the value of the reference model is accessed as indicated in a block 78 and the recognition is set to the reference model value as indicated in a block 80.

Thus it will be seen that there is provided a points based handwriting recognition system which achieves the various considerations, aspects and features of the present invention and which is well suited to meet the conditions of practical usage.

As various changes might be made in the present invention without departing from the spirit thereof, it is to be understood that all matter herein described or shown in the accompanying drawings is to be interpreted as illustrative and not in a limiting sense.

What is claimed is:

1. A handwriting recognition system for use in inputting data to a processor implemented device, the recognition system including a writing surface comprising a matrix of adjacent x, y coordinates, the writing surface having a grid defined by a plurality of discrete points spaced from one another by a discernable distance, the distance comprising a plurality of adjacent x, y coordinates, the processor being operatively connected to the writing surface, the processor being programmed to transform the sequential order of x, y coordinates the path a handwritten character passes through when written on the writing surface to a sequential order of grid points, the processor accessing a model library of sets of sequential point descriptions, each set having a value corresponding to data to be input, the processor being programmed to compare the transformed sequential order of grid points with the order of points of the model sets, the processor being programmed to determine which model set matches the transformed sequential order of grid points and to set a recognition to the value of the matching model set.

2. A handwriting recognition system as constructed in accordance with claim 1 wherein the writing surface comprises a touch pad.

3. A handwriting recognition system as constructed in accordance with claim 1 wherein the grid is defined by nine discrete grid points arranged in three columns of three grid points each.

4. A handwriting recognition system as constructed in accordance with claim 3 wherein the grid points are equidistantly spaced from one another.

5. A handwriting recognition system as constructed in accordance with claim 1 wherein the grid is defined by twelve discrete grid points arranged in three columns of four grid points each.

6. A handwriting recognition system as constructed in accordance with claim 5 wherein the grid defines a horizontal base line beneath which depending portions of selected alphabet letter characters are written.

7. A handwriting recognition system as constructed in accordance with claim 1 wherein the sequential point descriptions of the model sets include optional points through which the path of the corresponding handwritten character may or may not pass, the processor determining which model set matches the transformed sequential order of grid points without requiring the transformed sequential order of grid points to include any of the optional points.

8. A handwriting recognition system as constructed in accordance with claim 7 wherein the model library of sets is stored in a memory.

9. A method of teaching a user of a portable processor implemented device to handwrite processor recognizable data entries, the method comprising the steps of:

a) providing a writing surface having a matrix of adjacent x, y coordinates, b) superimposing a grid on the writing surface, the grid comprising a plurality of discrete points spaced from one another a discernable distance, the distance comprising a plurality of adjacent x, y coordinates, c) instructing the user to write designated characters on the writing surface by traversing the grid in a path which passes through designated grid points in a designated sequential order of points in simulation of natural handwriting.

10. A method of teaching in accordance with claim 9 wherein the user is instructed that the path may but is not required to pass through selected optional points.

11. A method of teaching in accordance with claim 9 wherein the plurality comprises twelve points arranged in three columns of four grid points each, the grid defining a horizontal base line, the user being instructed that the path forming selected alphabetic letter characters is to extend below the baseline.

12. A method of generating processor recognizable handwritten characters, the method comprising the steps of:

a) providing a writing surface having a matrix of adjacent x, y coordinates, b) positioning a grid on the writing surface, the grid being defined by a plurality of discrete points spaced from one another a discernable distance, the distance comprising a plurality of adjacent x, y coordinates, c) storing a library comprising a plurality of model sets, each model set comprising a plurality of sequential points, each model set having a corresponding data entry value, d) writing a selected character on the writing surface along a path sequentially passing through selected points, e) transforming ascertaining the sequential order of x, y coordinates through which the written path extended into a sequential order of grid points, f) accessing the stored model sets, and g) comparing the transformed sequential order of grid points with the plurality of sequential points of accessed model sets.

13. A method of generating processor recognizable handwritten characters in accordance with claim 12 further including the step of:

h) ascertaining the data entry character value of a matching model set and inputting such data entry value into the processor.

14. A method of generating processor recognizable handwritten characters in accordance with claim 12 wherein selected model sets include optional points within the sequential order, the step of comparing including accepting as a match, a transformed sequential order of grid points which does not include one or more of the optional points of a model set.

15. A method of generating processor recognizable handwritten characters in accordance with claim 12 wherein the grid comprises twelve points configured in three columns of four points each, the grid defining a baseline, the step of writing a selected character on the writing surface including writing an alphabetic letter character having a depending portion along a path which extends below the baseline.

* * * * *